United States Patent Office 2,864,346
Patented Dec. 16, 1958

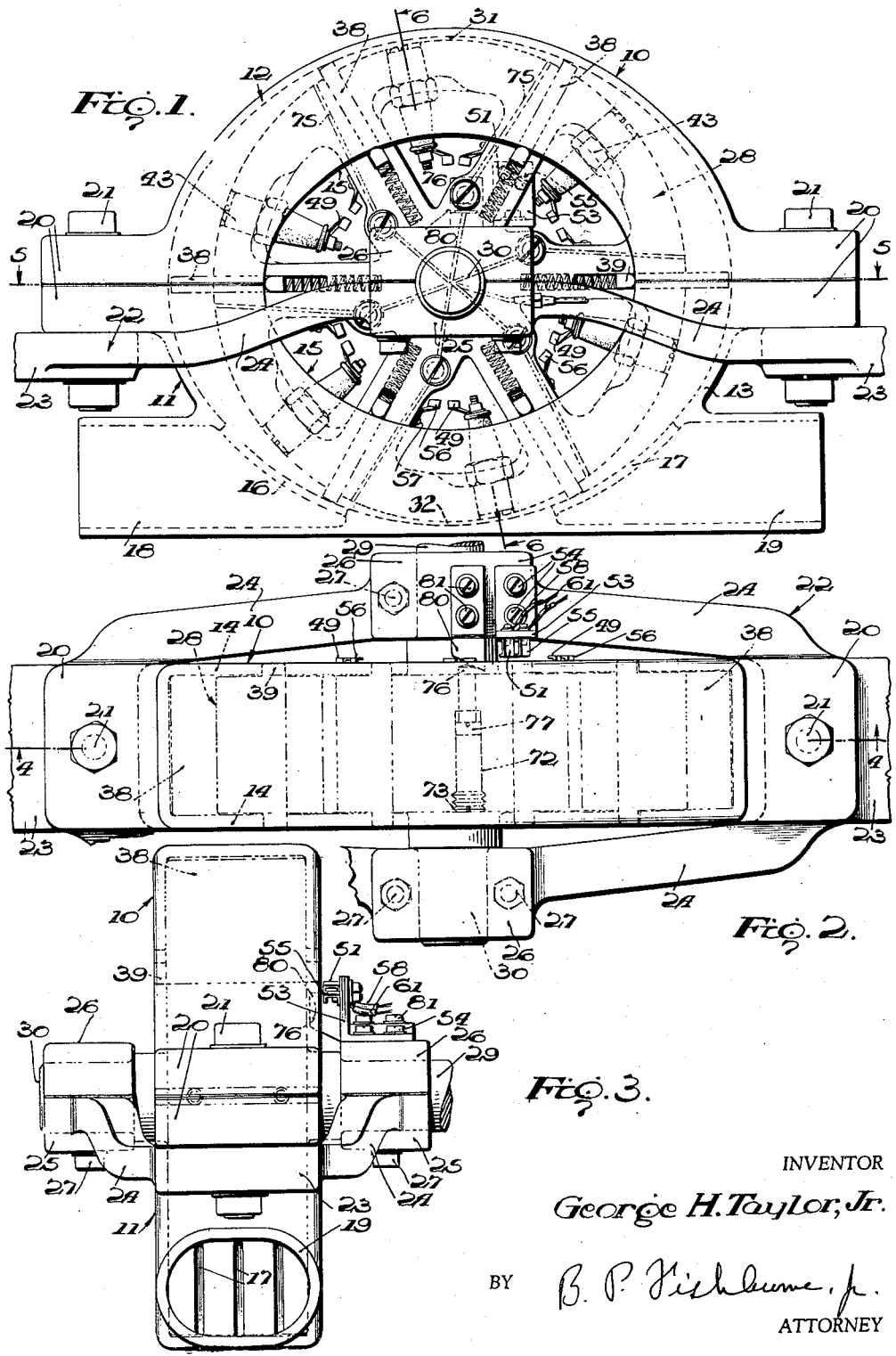

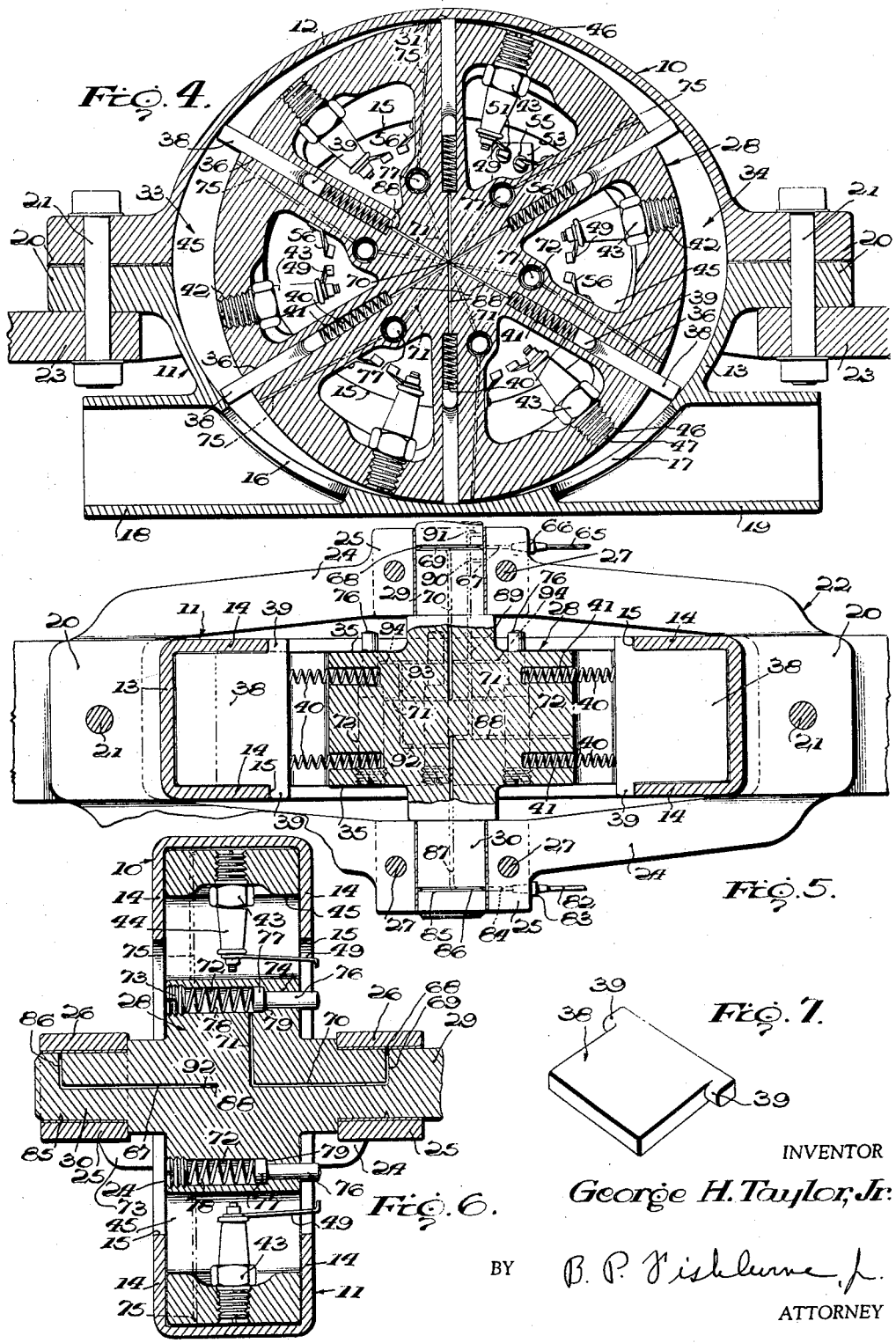

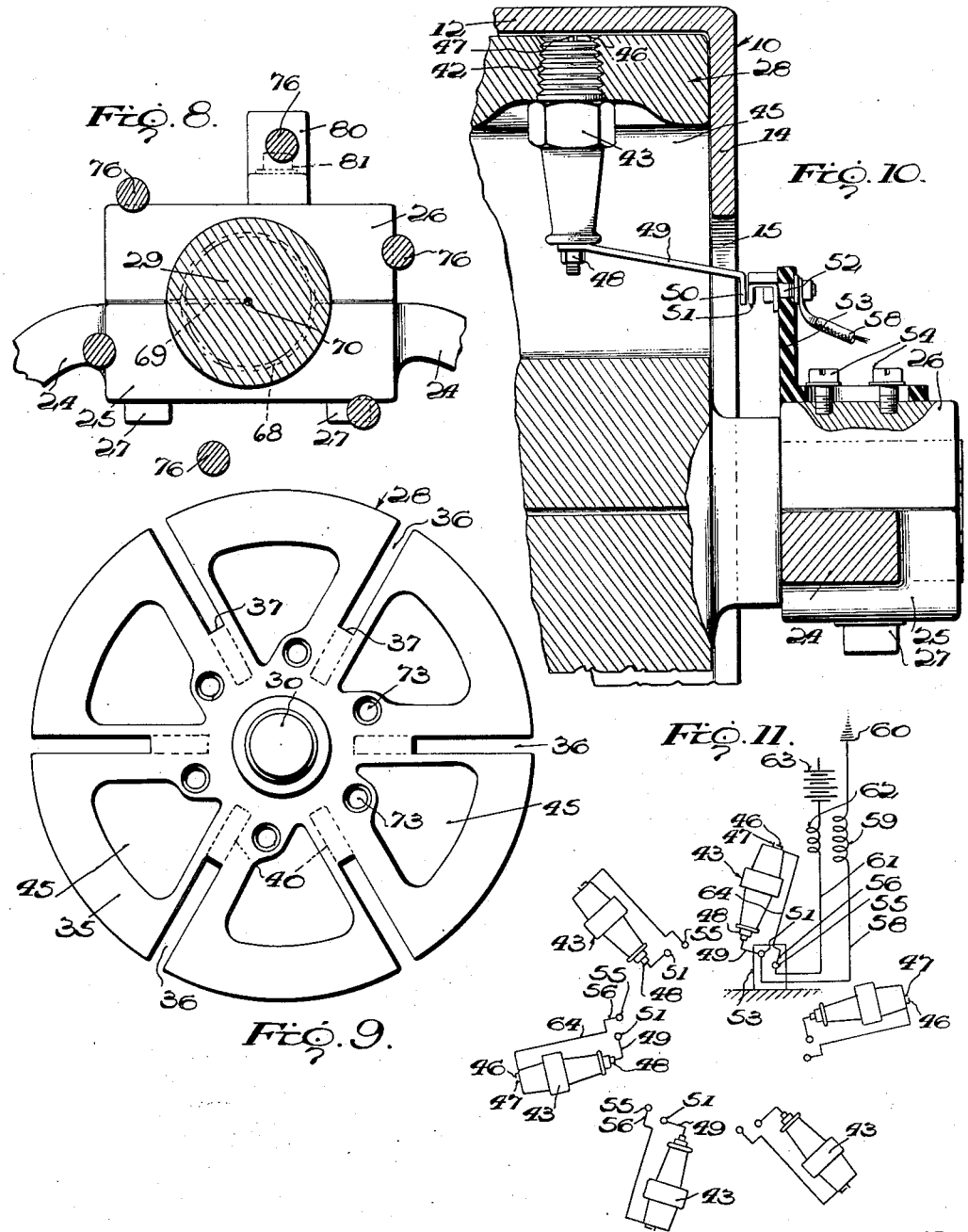

2,864,346

ROTARY INTERNAL COMBUSTION ENGINE

George H. Taylor, Jr., Wilmington, Del.

Application May 7, 1957, Serial No. 657,620

9 Claims. (Cl. 123—16)

The invention relates to a rotary internal combustion engine.

A primary object of the invention is to provide a high speed low friction internal combustion engine for automotive or like usage, the engine being of highly simplified and compact construction, well balanced as to mass, embodying relatively few working parts, and having a simplified mode of operation.

An additional object is to provide a rotary internal combustion engine which utilizes direct fuel injection into the combustion space, the engine being so designed that there need not be complete separation of intake air and exhaust gases.

A further object is to provide an internal combustion engine of the above-mentioned character which may be utilized as a jet engine, by taking advantage of the jet effect produced by the exhaust gases emanating from the engine.

A further object is to provide a rotary internal combustion engine having an elliptical housing, and a circular fly wheel rotor which bodily carries all moving parts of the engine.

An additional object is to provide an engine of the above-mentioned character which requires relatively few expensive machining operations or close tolerances during manufacturing of the engine.

A further object is to provide an engine which is extremely easy to assemble, disassemble and service or maintain.

Still another object is to provide a rotary internal combustion engine which utilizes centrifugal force to create an oil seal between the radial vanes and side walls of the housing, thus rendering the engine free of complicated mechanical sealing devices.

Other objects and advantages of the invention will be apparent during the course of the following description.

In the accompanying drawings, forming a part of this application, and in which like numerals are employed to designate like parts throughout the same.

Figure 1 is a side elevation of a rotary internal combustion engine and supporting means in accordance with the invention.

Figure 2 is a plan view of the engine shown in Figure 1.

Figure 3 is a side elevation of the engine taken at right angles to Figure 1.

Figure 4 is a central vertical section taken on line 4—4 of Figure 2.

Figure 5 is a horizontal section taken on line 5—5 of Figure 1.

Figure 6 is a diagonal section taken on line 6—6 of Figure 1.

Figure 7 is a perspective view of a vane or valve element removed.

Figure 8 is an enlarged fragmentary sectional view, partly diagrammatic, taken through the fuel injection pistons and associated elements and showing the stationary cam for operating the pistons.

Figure 9 is an end elevation of the fly wheel rotor.

Figure 10 is an enlarged fragmentary radial section through the engine showing the arrangement for firing each spark plug, parts omitted.

Figure 11 is a diagram of the engine ignition system.

In the drawings, wherein for the purpose of illustration is shown a preferred embodiment of the invention, the numerals 10 and 11 designate generally companion semi-elliptical casing or housing sections. In assembly, as shown in the drawings, the casing sections 10 and 11 make up a complete elliptical housing for the rotor structure to be described.

The casing sections 10 and 11 comprise elliptically curved walls 12 and 13, the inner faces of which are smoothly machined, and spaced opposed parallel side walls 14, the inner faces of which are likewise flat and smooth. The side walls 14 are arranged at right angles to the elliptically curved walls 12 and 13, and formed integrally therewith, so that each casing section 10 and 11 is generally U-shaped in cross section, as shown.

The casing side walls 14 have inner accurately formed elliptical edges 15, and the ellipses formed by the edges 15 are symmetrical with the elliptical walls 12 and 13, as best indicated in Figure 4. The engine housing formed by the housing sections 10 and 11 thus has a relatively large central elliptical opening formed therethrough axially. The housing is therefore relatively thin or narrow in the radial direction, and also narrow axially as viewed in Figures 2 and 3. The generally U-shaped housing of the engine is inwardly open, between the side walls 14, as clearly shown in Figures 5 and 6.

The casing section 11 is provided in its elliptical wall 13 with air intake slots 16 and exhaust gas slots 17. Suitable air intake and exhaust manifolds 18 and 19 are provided in communication with the slots 16 and 17, respectively.

The casing sections 10 and 11 are provided with integral apertured mounting lugs 20, with the lugs of the companion casing sections arranged in opposed contacting relation in assembly, and rigidly secured together by suitable bolt means 21. The bolt means 21 is also rigidly connected with an engine supporting frame 22, having portions 23 underlying the lugs 20, Figure 4, and pairs of diverging arms 24 terminating at their inner ends in lower bearing sections 25 for shaft extensions of a rotor structure to be described. Bearing caps or sections 26 are provided, in opposed relation to the bearing sections 25, and rigidly secured thereto by bolt means 27. The frame 22 is thus designed to rigidly and fixedly support the engine casing formed of the two casing sections 10 and 11, previously described.

A circular or cylindrical fly wheel rotor 28 is provided, and this rotor includes a body portion and axial shaft extensions 29 and 30, integral therewith. The shaft extensions 29 and 30 are freely journaled for rotation within the engine frame bearings afforded by the bearing sections 25 and 26.

The body portion of the cylindrical fly wheel rotor 28 is arranged for rotation within the elliptical engine casing, as shown in Figure 4, and the machined outside diameter of the rotor 28 may be slightly less than the corresponding distance across the elliptical casing, measured on the minor axis of the ellipse formed by the casing walls 12 and 13. In actual practice, there may be from $\frac{1}{16}$ to $\frac{1}{8}$ of an inch clearance between the periphery of the rotor 28 and each of the walls 12 and 13 at the points 31 and 32, which are, respectively, the point of maximum compression in the engine and the mid-point between the intake and exhaust slots 16 and 17. Measured along the major axis of the ellipse formed by the casing walls 12 and 13, Figure 4, there are relatively wide moon-shaped spaces 33 and 34 between the periphery of the rotor 28 and the inner faces of the walls 12 and 13.

The spaces 33 and 34 taper gradually from their points of maximum width at the major elliptical axis of the engine casing toward the two points 31 and 32, Figure 4. The portion of the chamber 33 in direct communication with the air intake slots 16 constitutes the intake chamber of the engine, and the portion of the space 33 above the major axis of the ellipse and formed by the casing wall 12 constitutes the compression chamber of the engine. Likewise, the portion of the space 34 at the opposite side of the rotor formed by the wall 12 constitutes the combustion space or chamber and the expansion chamber of the engine, and the remaining portion of the space 34 below the major axis of the ellipse and communicating directly with the exhaust slots 17 makes up the exhaust chamber of the engine.

The opposite flat faces or ends 35 of the rotor 28 engage closely between the casing side walls 14 but have a smooth running fit therebetween. Inwardly of the elliptical margins or edges 15, the ends of the rotor 28 are fully uncovered, as shown.

The cylindrical rotor 28 has a plurality of circumferentially equidistantly spaced radial slots 36 formed entirely therethrough axially. The slots 36 open through the periphery of the rotor 28 and have their inner ends 37 disposed substantially midway between the periphery of the rotor and the central axis of the same, Figure 9. The slots 36 are preferably six in number, as shown, although the number of slots may be varied in the engine, as found desirable. The opposite faces of the slots 36 are preferably machined flat and smooth.

Slidably mounted within the slots 36 are flat generally rectangular radial vanes 38, adapted to serve the combined functions of engine valve elements, and reaction elements for converting the energy of combustion into torque. The vanes 38 extend for the full axial width of the rotor 28, Figure 5, and the outer extremities or tips of the vanes 38 are disposed close to but not quite in contacting relation with the inner faces of the elliptical walls 12 and 13. In practice, I contemplate leaving approximately one-thousandth of an inch of clearance between the outer tips of the vanes 38 and the inner elliptical faces of the walls 12 and 13. At their inner ends and upon opposite sides, the vanes 38 have integral lugs or projections 39, projecting outwardly from opposite sides of the vanes, and these projections slidably contact the elliptical edges 15 of the casing side walls 14 at all times. The projections 39 are preferably rounded, as shown in the drawings, for smooth contact with the elliptical edges 15, which edges accurately guide or position the vanes 38 radially of the rotor 28 during the operation of the engine. Inwardly of the radial vanes 38, expansible coil springs 40 are disposed within radial openings 41 formed in the rotor 28 inwardly of the slots 36. The outer portions of the springs 40 project into the slots 36 and engage the inner ends of the radial vanes 38 to constantly urge the same outwardly, so that the projections 39 will always remain in contact with the elliptical edges 15. The coil springs 40 will of course yield to permit inward movement of the vanes 38, as regulated by the action of the projections 38 against the elliptical edges 15. The arrangement is such that there will always be a substantially constant and very slight clearance between the outer ends of the vanes 38 and the inner faces of the elliptical walls 12 and 13, as previously stated.

The rotor 28 is further provided in its periphery and at its axial center with a plurality of circumferentially equidistantly spaced screw-threaded openings 42, for the mounting of spark plugs 43. The spark plugs correspond in number to the radial vanes 33, and the spark plugs extend radially inwardly from the periphery of the rotor 28, and have their insulated portions or heads 44 arranged within openings 45, formed entirely through the rotor 28 axially thereof. The spark plugs are thus readily accessible through the openings 45 and inwardly of the elliptical margins 15, from either side of the engine. The spark plug electrodes 46 and 47 are exposed at the periphery of the rotor 28 for firing near and slightly beyond the point 31 of maximum compression in the engine. As shown in the drawings, the spark plugs 43 and the openings 45 are not spaced midway between adjacent slots 36, but are instead closer to one slot of each adjacent pair of slots, in order to provide space in the rotor for fuel injection means to be described.

For causing each spark plug 43 to fire just past the point 31 of maximum compression, at approximately the position indicated near the top of Figure 4, each spark plug has its inner terminal 48 connected with and carrying a metallic conductor strip 49 or moving contact. Each strip or contact 49 has a short lateral extension 50 disposed just outwardly of the casing side wall 14, Figure 10, for brushing contact with a first stationary contact element 51, secured at 52 to a suitable insulating bracket 53, which is in turn adjustably mounted at 54 upon the adjacent bearing section or cap 26, Figure 10. A second stationary contact 55 is likewise rigidly secured to the insulating bracket 53 and positioned near one side of the contact 51, Figures 2 and 3, for brushing engagement with a companion moving contact 56, adjacent to each spark plug contact 49. Each moving contact 56 is secured as at 57 to an adjacent portion of the metallic rotor 28, as shown.

It is thus seen that associated with each spark plug 43 there is a pair of contacts 49 and 56 which rotate with the rotor 28. The stationary contacts 51 and 55 carried by the bracket 53 are a single pair only, and the bracket 53 with the stationary contacts is located as shown in Figures 1 and 4, so that the stationary contacts will be brushed by the contacts 49 and 56 of each spark plug 43 when such spark plug is in the firing position illustrated in Figure 4. The particular contacts 49, 56, 51 and 55 shown in the drawings are merely illustrative of various forms of contacts which might be employed for causing each spark plug 43 to fire at the desired point just past the point 31 of maximum compression in the engine. For example, instead of the strip-type contacts 49 and 56 associated with each spark plug, rigid or button-type contacts could be mounted upon the adjacent end of the rotor 28, in proper position to brush the stationary contacts 51 and 55, and the button-type contacts could be connected by means of wires with the electrodes 48 of the spark plugs.

With reference to the ignition circuit shown diagrammatically in Figure 11, the stationary contact 51 is connected through a wire 58 with a high tension ignition coil 59, grounded at 60. The other stationary contact 55 is likewise connected through a wire 61 and coil 62 with a storage battery 63. As each spark plug 43 reaches the firing position indicated at the upper right hand portion of Figure 11, its associated contacts 49 and 56 will instantaneously brush over the stationary contacts 51 and 55, and the desired spark will jump between the electrodes 46 and 47 of the particular spark plug to ignite the fuel charge. At the instant of firing, Figure 11, current will flow from the battery 63 and through the wire 61 and the contacts 55 and 56 and through the wire 64 to the spark plug electrode 46. The circuit continues through the opposite electrode 47 of the spark plug to the terminal 48 and through the moving contact 49 and stationary contact 51 and through the wire 58 and coil 59 to ground at 60. The moving contact 56 and the metallic shell of the spark plug 43 are likewise grounded through the rotor 28.

Means are provided to inject liquid fuel directly into the combustion chamber just beyond the point 31 of maximum compression, and preferably during a small angular movement of the rotor between points upon opposite sides of the exact firing position of the spark plug, Figure 4. The fuel injection means comprises a fuel line 65, leading from a fuel pump not shown, and connected with a fitting 66 in one bearing section 25, communicating with a radial port 67 formed through the bearing section 25, Figure 5. The radial fuel port 67 leads directly into an annular fuel groove 68 formed in the adjacent shaft extension 29, which groove leads to a radial port 69 within the shaft extension 29, in turn opening into a central axial fuel port 70 formed through the shaft extension 29 and rotor 28, as shown.

Near the axial center of the rotor 28, Figures 5 and 6, the axial fuel port 70 communicates with a plurality of circumferentially equidistantly spaced radial ports 71. The ports 71 correspond in number to the vanes 38 and spark plugs 43. The radial ports 71 extend outwardly through the rotor 28 and open into axial bores or fuel chambers 72 formed within the rotor between the large openings 45 and the radial slots 36, Figure 4. The bores 72 are likewise equidistantly spaced circumferentially of the rotor and also spaced equidistantly from the center of the rotor as defined by the axial port 70, Figure 4. Corresponding ends of the bores 72 are preferably closed by screw-threaded plugs 73, and the opposite ends of the bores 72 open into somewhat reduced bores 74, which open through the opposite end face of the rotor 28, Figure 6.

Near its end having the plug 73, each bore 72 communicates with an elongated generally radial fuel injection port 75 formed through the rotor 28, and opening through the periphery thereof near one side of an adjacent slot 36, Figure 4. The ports 75 correspond in number with the bores 72 and radial ports 71. The ports 75 are also equidistantly spaced circumferentially of the rotor 28.

As best shown in Figure 4, the fuel injection port 75 for each spark plug 43 is located considerably in advance of the spark plug for which it supplies liquid fuel, it being understood that the rotor 28 turns in the clockwise direction, Figure 4, during the operation of the engine.

Slidably mounted within each reduced bore 74 is a pin-like fuel injection plunger or piston 76 having an enlarged head 77 disposed within the bore 72. A coil spring 78 within each bore 72 bears against the plunger head 77 and maintains the latter seated against a shoulder 79, so that the head 77 normally leaves the adjacent radial fuel port 71 uncovered, Figure 6. Each fuel injection plunger 76 projects somewhat beyond the adjacent end face of the rotor 28, and travels in a circular path with the rotor during the operation of the engine. As shown in Figure 2, a stationary beveled cam element 80 is fixedly secured at 81 to the adjacent bearing section 26, and the cam element 80 is directly in the path of movement of the several fuel injection plungers 76. The arrangement is such that when each plunger 76 passes the cam 80, its outer extremity will engage the beveled end of the cam and the plunger will be shifted axially inwardly toward the plug 73. The spring 78 will compress to permit this inward movement of the plunger 76, but as soon as each plunger disengages or passes over the cam 80, the spring 78 will immediately return it to the normal position shown in Figure 6. When each fuel injection plunger 76 is thus forced inwardly by contact with the beveled cam 80, its head 77 will first cover the radial port 71, and substantially simultaneously force or inject a small quantity of liquid fuel from the bore 72 radially outwardly through the associated fuel injection port 75 and into the combustion space of the engine just past the point 31 of maximum compression, Figure 4.

It should of course be understood that the single fixed cam 80 actuates each plunger 76 in succession, and the beveled end of the cam 80 is of a proper width and inclination to inject the desired volume of liquid fuel into the combustion space through the particular port 75 and during a small angular increment of rotation of the rotor 28. As previously suggested, this small increment of rotation during which fuel is injected into the combustion space is preferably from a point somewhat closer to the point 31 than the firing position of each spark plug, and continuing to a second point somewhat beyond the firing position in Figure 4. The exact duration of fuel injection and the quantity of fuel injected may be varied as found desirable by altering the design of the cam 80.

It should further be pointed out that it is the fuel injection port 75 in advance of each spark 43, in the clockwise direction, Figure 4, which injects the fuel for each spark plug. In other words, when each spark plug 43 reaches the firing position of Figure 4, and the firing occurs, the injection of fuel by the port 75 in advance of the particular spark plug will have been completed. No more fuel will be injected into the combustion space until the next succeeding port 75 reaches a point just beyond the point 31 of maximum compression.

A lubricating oil line 82 from a suitable source of oil under pressure is connected with a fitting 83 within the other bearing section 25, Figure 5, and the fitting 83 communicates with a radial port 84 in the bearing section, in turn opening into an annular groove 85 in the adjacent shaft extension 30 of the rotor. From the groove 85, the lubricating oil enters a radial port 86 of the shaft extension 30 and from this port the oil passes into a central axial oil port 87 from through the shaft extension 30 and rotor 28, as shown. The axial oil port 87 extends to a point near the axial center of the rotor 28, and communicates with a plurality of circumferentially equidistantly spaced radial oil ports 88, leading outwardly and opening into the inner ends of the radial slots 36. From any one of the radial slots 88, a generally axial oil port 89 extends parallel to the fuel port 70, through the shaft extension 29 and communicates with short radial ports 90 and 91, Figure 5, arranged upon opposite sides of the port 67. The purpose of the ports 89, 90 and 91 is to convey oil under pressure to opposite sides of the radial fuel port 67 and groove 68 for sealing the latter against leakage. Since lubricating oil is a denser medium than gasoline or like liquid fuel used in the engine, the lubricating oil will seal the liquid fuel entering the groove 68 of the port 67, and the fuel will not tend to leak from the bearing of the shaft extension 29.

In a similar manner, branch oil ports 92, 93 and 94 leading from the axial port 87 convey lubricating oil to the plunger bores 74, to maintain the same sealed against the leakage of fuel from within the bore 72. If desired, the ports 92, 93 and 94 may be omitted entirely, and likewise, the ports 89, 90 and 91 may be omitted.

The lubricating oil conveyed to the slots 36 by means of the radial ports 88 will thoroughly lubricate the vanes 38 and the side walls 14 of the engine housing, and centrifugal force caused by the high speed of rotation of the rotor 28 will tend to make the lubricant within the housing sections 10 and 11 self-sealing, and no seals will be required to prevent leakage of oil during the operation of the engine.

*Operation*

The rotor shaft extension 29 may be cranked by any suitable means for starting the engine. The rotor 28 turns clockwise, Figures 1 and 4, and air is drawn through the intake manifold 18 and slots 16 to the lower portion of the chamber 33, Figure 4. As the rotor continues to turn, the air trapped between a pair of the vanes 38 becomes increasingly compressed toward the upper portion of the chamber 33, as maximum compression is reached at the point 31, when the particular pair of vanes 38 are spaced equidistantly from the point 31 in the manner shown in Figure 1.

At a joint just past the maximum compression point 31, each fuel injection port 75 in succession will begin to inject fuel into the combustion space, formed by the upper portion of the chamber 34, Figure 4. As previously described, this injection of fuel into the combustion space is controlled by contact of each plunger 76 with the fixed cam 80. Fuel injection continues for a few degrees of rotation of the rotor 28, and the injection from each port 75 will be completed, slightly beyond the approximate firing point of the uppermost spark plug 43, as shown in Figure 4.

Each spark plug 43 will fire in succession at approximately the point indicated in Figure 4, a few degrees past the point 31 of maximum compression, and substantially instantaneously following the injection of fuel in the firing zone by the preceding injection port 75. When the spark plug 43 is thus fired, by the action of its associated contacts 49 and 56 sweeping over the pair of fixed contacts 51 and 55, as previously described, combustion will take place in the upper portion of the chamber 34, Figure 4, between the pair of radial vanes 38 on opposite sides of the particular firing plug 43.

The energy of the combustion or explosion in the combustion space reacts upon the radial vane 38 which is beyond the point 31 of maximum compression and in the upper right hand quadrant of the engine as shown in Figure 4, and the combustion gases expand within the widening chamber 34 as the rotor 28 continues to turn in the clockwise direction. In this manner, the energy of the explosion is transmitted into torque upon the rotor, through the successive vanes 38. Following the expansion cycle, which increases to the widest point in the chamber 34, the combustion gases pass into the lower portion of the chamber 34, and as they approach the lower narrowing end portion of the chamber, the exhaust gases pass outwardly through the slots 17 and the exhaust manifold 19, to complete the cycle of operation.

It should now be apparent that the radial vanes 38 serve dual purposes in the engine. The vanes serve first as intake and exhaust valve elements, for drawing air into the engine through the slots 16 and for subsequently expelling exhaust gases through the slots 17. The vanes also serve as the elements of the engine which compress the charge, preparatory to firing or combustion, and the vanes additionally serve, subsequent to firing, as the reaction elements for converting the energy of the explosion into torque upon the working shaft extension 29.

If preferred, suitable covers may be placed over opposite sides of the engine for covering the large elliptical openings formed by the edges 15, and the ignition and fuel injection elements inwardly of these openings. For the sake of simplification, no cover means has been shown in the drawings, and the cover means is not essential to the engine and may be omitted entirely if desired.

It is to be understood that the form of the invention herewith shown and described is to be taken as a preferred example of the same and that various changes in the shape, size and arrangement of parts may be resorted to, without departing from the spirit of the invention or the scope of the subjoined claims.

Having thus described the invention, I claim:

1. A rotary internal combustion engine comprising a substantially elliptical casing having air intake and exhaust gas opening means, a substantially circular rotor mounted for rotation within said casing and defining with the elliptical wall of the casing a pair of chambers tapering in opposite directions toward the minor axis of the ellipse defined by said casing, substantially radial vanes movably mounted upon said rotor and adapted to have their tips passing close to the elliptical wall of said casing, elliptical cam means on said casing separate from said elliptical wall and engaging said vanes to regulate the radial movement thereof during the operation of the engine, a plurality of circumferentially spaced spark plugs carried by said rotor, rotating contact means associated with each spark plug, a fixed contact means mounted upon said casing for brushing engagement with said rotating contact means of each spark plug for firing each spark plug in succession near the point of maximum compression of the engine, fuel injection means on said rotor for injecting fuel into one of said chambers slightly in advance of each spark plug and near the point of maximum compression in the engine, and cam means on said casing separate from said elliptical wall and first-named cam means for operating said fuel injection means.

2. A rotary internal combustion engine comprising a substantially elliptical casing having air intake and exhaust gas opening means, said casing being generally U-shaped in cross section with side walls having elliptically curved edges serving as cams, a substantially cylindrical rotor mounted for rotation within the casing and having a plurality of circumferentially spaced slots, radial vane elements mounted within the slots and having projections engaging said elliptically curved edges for regulating the vanes during rotation of the rotor, the tips of the vane elements engaging close to the elliptical wall of said casing, spring means urging the vane elements into engagement with said elliptically curved edges, ignition means carried by said rotor for igniting fuel within the casing near the point of maximum compression, and means for injecting fuel into the casing near the point of maximum compression.

3. A rotary internal combustion engine comprising a substantially elliptical casing including a substantially elliptical wall and relatively narrow side walls having elliptical edges, said elliptical edges defining a relatively large elliptical opening through said casing axially thereof, a substantially cylindrical rotor mounted within the elliptical casing for rotation and having a diameter slightly less than the width of the elliptical casing measured on its minor axis, a plurality of circumferentially spaced movable radial vane elements carried by said rotor and having side projections engaging said elliptical edges and guided thereby, springs for maintaining the projections of said vane elements in contact with the elliptical edges, spark plugs carried by the rotor between adjacent pairs of the vane elements and having contacts which move with the rotor, relatively stationary contacts connected with the casing and disposed in the path of travel of the spark plug contacts to brush the same for causing each spark plug in succession to fire near the point of maximum compression in the engine, said rotor having fuel chamber means formed therein for the reception of fuel, reciprocatory plunger means connected with the fuel chamber means and moving with the rotor, and a fixed cam connected with said casing in the path of movement of the plunger means and adapted to actuate the plunger means for injecting fuel from the fuel chamber means into the combustion space of the engine near the point of maximum compression, said rotor having fuel injection port means leading from said fuel chamber means.

4. A rotary internal combustion engine comprising an elliptical casing, a rotor mounted to turn within said casing, vane elements carried by the rotor and adapted to project beyond the periphery of the rotor in close proximity to the elliptical wall of the casing, elliptical cam means upon said casing separate from said elliptical wall and engaging the vane elements to guide the same, spark plugs secured to the rotor to turn therewith and having electrical contacts turning with the rotor, stationary contacts mounted in the path of travel of the spark plug contacts to engage the latter and fire the spark plugs in succession, said rotor having internal fuel injection passage means opening through the periphery of the rotor, plunger means associated with the fuel injection passage means to force fuel from the passage means beyond the periphery of the rotor, and stationary cam means separate from said elliptical wall and said elliptical cam means engageable with said plunger means to actuate the same for effecting the fuel injection.

5. A rotary internal combustion engine comprising a substantially elliptical casing, a substantially cylindrical rotor mounted for rotation within said casing and having vane valve elements adapted to follow the elliptical wall of the casing, spark plugs mounted upon the rotor to turn therewith and spaced apart circumferentially of the rotor, means for firing the spark plugs in succession near the point of maximum compression in the engine, said rotor having a plurality of bores formed therein in circumferentially spaced relation, fuel port means in the rotor leading to said bores, a corresponding number of fuel injection ports in the rotor leading from said bores and opening through the periphery of the rotor and being circumferentially spaced, a plunger associated with each bore of the rotor and projecting beyond one end of the rotor, and a fixed cam element engageable with the projected portion of each plunger to actuate the plungers in succession upon rotation of the rotor for injecting fuel into the combustion space of the engine through said fuel injection ports.

6. A rotary internal combustion engine comprising a rotor, fuel injection means carried by the rotor for rotation therewith, ignition means carried by the rotor for coaction with the fuel injection means of the rotor, combined impeller and valve elements carried by the rotor and movable relative thereto, a housing for the rotor including an eccentric wall engageable with said elements for causing movement of the same relative to the rotor when the rotor turns, stationary means separate from the eccentric wall of the housing and carried by the housing to actuate the fuel injection means carried by the rotor when the rotor turns, and stationary means to energize said ignition means carried by the rotor when the rotor turns.

7. A rotary internal combustion engine comprising a rotor, a plurality of circumferentially spaced fuel injection plungers carried by the rotor and projecting beyond one face thereof, the rotor having fuel injection port means communicating with said plungers, a plurality of spark plugs corresponding in number to said plungers and carried by the rotor in circumferentially spaced relation, contact elements carried by the spark plugs and turning with the rotor and projecting beyond one face thereof, a plurality of combined impeller and valve elements carried by the rotor and adapted to reciprocate radially relative thereto, a housing for the rotor including an eccentric cam portion engageable with said elements for causing reciprocation of the same as the rotor turns, a fixed cam element to engage said fuel injection plungers in succession during turning of the rotor, and fixed contact means to engage said contact elements of the spark plugs during turning of the rotor.

8. A rotary internal combustion engine comprising a substantially cylindrical rotor having axial shaft extensions, spark plugs bodily mounted upon the rotor in circumferentially equidistantly spaced relation, the rotor having openings formed therethrough adjacent the spark plugs to permit access to the spark plugs radially inwardly of the periphery of the rotor, said openings being equidistantly spaced radially, said rotor having a plurality of radial slots formed therein corresponding in number to the spark plugs and being equidistantly spaced circumferentially and arranged between adjacent pairs of said openings, radial vanes disposed within said slots, springs engaging said vanes to urge them radially outwardly, said rotor having fuel injection port means opening through the periphery of the rotor, a plurality of fuel injection plungers carried by the rotor and communicating with the port means and corresponding in number to the spark plugs and vanes and being equidistantly spaced circumferentially of the rotor, whereby the rotor is dynamically balanced during rotation about the axis of said shaft extensions, a substantially elliptical housing for said rotor having an elliptical wall arranged close to the outer tips of said vanes and side walls having large elliptical openings constituting elliptical cams, shoulders on said vanes slidably contacting said elliptical cams during turning of the rotor, said rotor having its opposite ends exposed inwardly of said cams, ignition means to energize said spark plugs in succession during turning of the rotor, fixed cam means to reciprocate said plungers in succession during turning of the rotor, and bearings for said shaft extensions connected with said housing.

9. A rotary internal combustion engine according to claim 8, and wherein said fuel injection port means includes a plurality of circumferentially equidistantly spaced generally radial ports in said rotor and an axial port in said rotor and one of said shaft extensions.

References Cited in the file of this patent
UNITED STATES PATENTS

| | | |
|---|---|---|
| 921,802 | Conkey | May 18, 1909 |
| 1,577,141 | Morrison et al. | Mar. 16, 1926 |